United States Patent [19]

Spiegelberg et al.

[11] Patent Number: 5,606,887
[45] Date of Patent: Mar. 4, 1997

[54] APPARATUS AND METHOD FOR COLD FORMING AN L-SHAPED LEAD ALLOY BATTERY TERMINAL

[75] Inventors: Bernard N. Spiegelberg, Germantown; Mark E. Sauter, Shorewood, both of Wis.

[73] Assignee: Tulip Corporation, Milwaukee, Wis.

[21] Appl. No.: 461,569

[22] Filed: Jun. 2, 1995

[51] Int. Cl.⁶ .................................................. B21D 22/00
[52] U.S. Cl. ............................ 72/357; 72/356; 72/354.6
[58] Field of Search ........................ 72/356, 357, 353.2, 72/354.2, 334, 354.6, 107, 110

[56] References Cited

U.S. PATENT DOCUMENTS

| | | | |
|---|---|---|---|
| 1,338,462 | 4/1920 | Rydbeck | 72/354.2 |
| 1,668,996 | 5/1928 | Anderson . | |
| 1,766,098 | 6/1930 | Booth . | |
| 1,784,745 | 12/1930 | Nier | 72/68 |
| 1,994,178 | 3/1935 | Raiche . | |
| 2,372,011 | 3/1945 | Remington . | |
| 2,392,175 | 1/1946 | Norton . | |
| 2,526,489 | 10/1950 | Liddicoat . | |
| 2,566,243 | 8/1951 | Nyquist . | |
| 2,966,987 | 1/1961 | Kaul . | |
| 2,978,932 | 4/1961 | Frueauff . | |
| 3,186,209 | 6/1965 | Friedman | 72/356 |
| 3,280,613 | 10/1966 | Schröm . | |
| 3,712,099 | 1/1973 | Elsbett et al. | 72/107 |
| 4,177,665 | 12/1979 | Schurmann . | |
| 4,193,179 | 3/1980 | Confer et al. | 72/107 |
| 4,197,772 | 4/1980 | Anderson et al. | 83/63 |
| 4,416,141 | 11/1983 | Nippert . | |
| 4,423,617 | 1/1984 | Nippert | 72/356 |
| 4,463,590 | 8/1984 | Theobald | 72/356 |
| 4,649,731 | 3/1987 | Eisenmann . | |
| 4,653,305 | 3/1987 | Kanamaru et al. . | |
| 4,776,197 | 10/1988 | Scott | 72/353 |
| 4,785,649 | 11/1988 | Watanabe et al. | 72/107 |
| 4,945,749 | 8/1990 | Walker et al. | 72/356 |
| 5,048,590 | 9/1991 | Carter | 164/120 |
| 5,296,317 | 3/1994 | Ratte et al. | 429/178 |
| 5,349,840 | 9/1994 | Ratte et al. | 72/327 |
| 5,425,170 | 6/1995 | Spiegelberg et al. | 72/357 |

FOREIGN PATENT DOCUMENTS

| | | |
|---|---|---|
| 0117213 | 8/1984 | European Pat. Off. . |
| 5-169183 | 7/1993 | Japan . |
| 902969 | 2/1982 | U.S.S.R. . |

OTHER PUBLICATIONS

FETTE May 1994 Catalog pp. 123–125, 130–134.

*Primary Examiner*—Lowell A. Larson
*Assistant Examiner*—Rodney Butler
*Attorney, Agent, or Firm*—Foley & Lardner

[57] ABSTRACT

A method and apparatus to cold form an L-shaped lead battery terminal. The apparatus includes a forming station for cold forming an L-shaped lead battery terminal having a tower offset from the head. The forming station includes a split die for forming a head having a radial ring. The apparatus also includes a punching station for forming a continuous through hole in the head and a recess in the tower. Another method and apparatus to cold form an L-shaped lead battery terminal includes a forming station, punching station and a rolling station for forming a ring on the terminal. The forming station includes a unitary die to form a head having a uniform diameter and a tower offset from the head. The rolling station includes a fixture, a rolling head having a plurality of rollers, and a drive system for engaging and rotating the rolling head and lead battery terminal relative to each other.

14 Claims, 13 Drawing Sheets

5,606,887

APPARATUS AND METHOD FOR COLD FORMING AN L-SHAPED LEAD ALLOY BATTERY TERMINAL

BACKGROUND OF THE INVENTION

This invention relates generally to an apparatus and method for cold forming an L-shaped lead battery terminal.

In general, battery terminals are utilized as an interface between a sealed battery container and an external device seeking electrical power. Battery terminals are typically formed from lead in a cold or hot forming process. In a hot forming process a lead alloy is heated until it is in a molten state. The molten lead is then poured into a mold or casting and formed into a semi-finished or finished battery terminal. In the cold forming process a lead slug typically at room temperature is subjected to a number of pressing, punching and machining operations in order to create a finished battery terminal.

The hot forming process requires that the lead be heated until it reaches the molten state and then subsequently poured into a mold until it cools. A disadvantage of this method is that it requires the melting of a lead alloy to form the battery terminal. The use of melting for forming terminals may create undesirable porosity and is expensive to implement in an environmentally safe manner.

Existing methods of cold forming a standard battery terminal from a lead slug require a number of individual steps. In one method a lead slug is first modified in a preform station and then subsequently formed into a finished battery terminal in a final forming press having a split die. Alternatively, in a second method a lead slug is formed into a semi-finished battery terminal in a first station having a split die and then subsequently machined to create a finished battery terminal.

These methods of cold forming a battery terminal require a split die to form the plurality of parallel rings used to prevent movement of the battery terminal along its longitudinal axis.

The method of using a split die to form these rings results in a flash line located on the battery terminal caused by the dividing lines between the portions of the split die. This flash line can result in seepage when the battery terminal is installed in a battery.

An existing method for cold forming threads for bolts and screws entails utilizing a thread rolling head. This method allow for both axial and radial threads or designs to be cold formed on a metal rod. Typical materials cold formed utilizing this process include brass, aluminum, steel and copper.

It would be desirable to have an L-shaped battery terminal cold formed from a lead slug. It would also be desirable to cold form a battery terminal utilizing a unitary lower die without the need for a split die. It would be further desirable to have a battery terminal cold formed from a lead slug without a flash line.

SUMMARY OF THE INVENTION

An embodiment of the apparatus for cold forming an L-shaped lead battery terminal from a lead slug includes a first die assembly, and a second die. The first die assembly includes a first die having an inner profile to form a head on an L-shaped lead battery terminal. The second die is mounted for movement toward and away from the first die. The second die includes a forming cavity having a first region and a second region. The first region has an inner profile to form a base of the L-shaped lead battery terminal. The second region has an inner profile to form a tower which extends normal to the base and is offset from a longitudinal axis of the head. The apparatus further includes a punch located within the first die assembly to form a recess within the L-shaped lead battery terminal.

An embodiment of the apparatus for forming rings on an L-shaped lead battery terminal includes a fixture, a ring forming head and a drive assembly. The fixture is configured to hold the L-shaped lead battery terminal. The ring forming head is configured to form rings on the L-shaped lead battery terminal when the terminal and ring forming head are rotated relative to each other. The drive assembly is fastened to the fixture and ring forming head to rotate the terminal and ring forming head relative to each other.

An embodiment of a method for forming a ring on an L-shaped lead battery terminal includes the step of engaging a ring forming head with the L-shaped lead battery terminal. The method further includes the step of rotating the rolling head and the L-shaped lead battery terminal relative to each other.

An embodiment of a method for manufacturing an L-shaped lead battery terminal in a cold forming process, includes the step of stamping a lead slug in a forming station having a split die. In this step a semi-finished L-shaped lead battery terminal is formed including a head having a radial ring, a base, a tower extending from the base and offset from the head, and a recess extending from the head toward a top surface of the base terminating in a blank wall. The method includes the step of transferring the semi-finished L-shaped battery terminal to a through punch station. The method further includes punching the semi-finished L-shaped battery terminal in the through punch station forming an L-shaped battery terminal having a through hole.

Another method for manufacturing L-shaped lead battery terminals in a cold forming process includes the step of stamping a lead slug in a first forming station. Thereby forming a partial-finished L-shaped lead battery terminal including a head having a substantially uniform outer diameter, a flange, a base, a tower extending from the base and offset from the head, and a recess extending from the head into the base and terminating in a blank wall. The method includes transferring the partial-finished L-shaped battery terminal to a through punch station. The method further includes punching the partial-finished L-shaped battery terminal in the through punch station forming a near-finished L-shaped battery terminal having a through hole. The method also includes transferring the near-finished L-shaped battery terminal to a rolling station. The method also includes engaging a ring forming head on the head of the near-finished battery terminal in the third rolling station. Finally the method includes forming a rolled battery terminal having a head including an annular ring.

DETAILED DESCRIPTION OF THE PREFERRED EMBODIMENT

Figure 1:
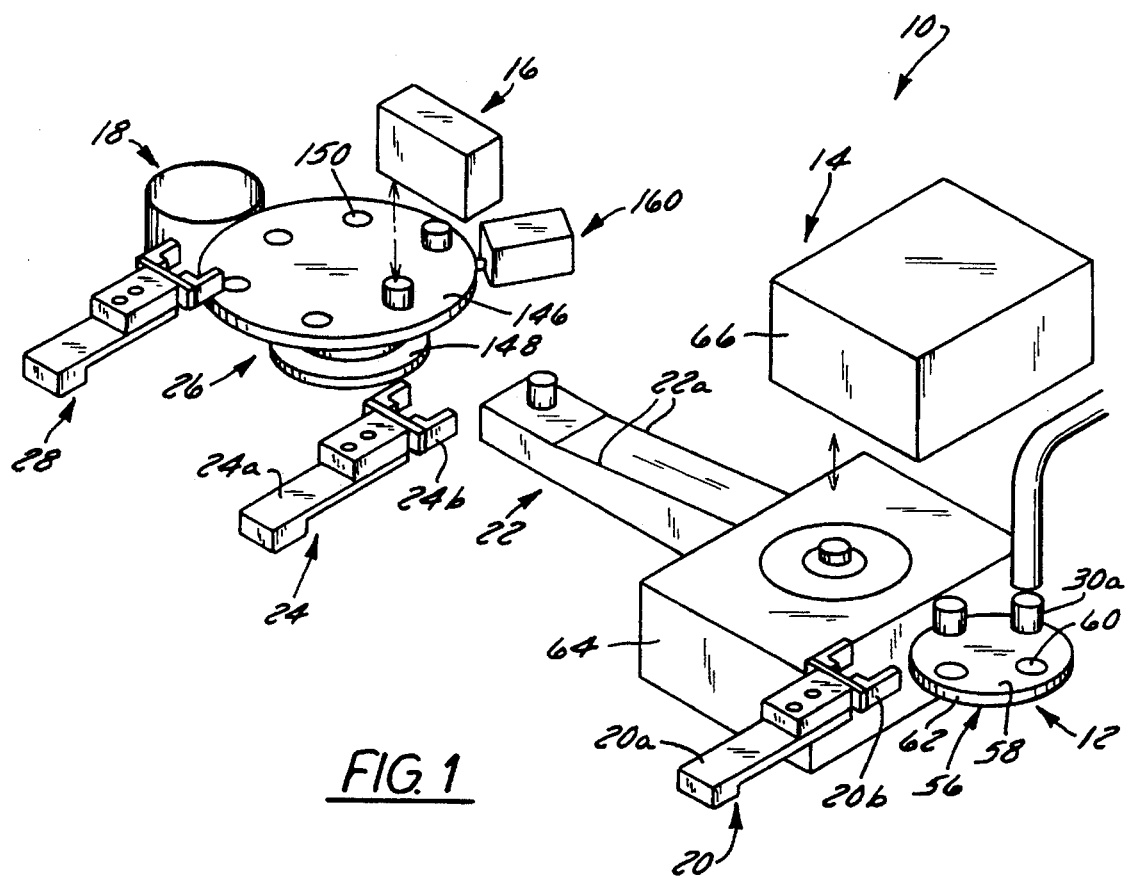
FIG. 1 is a schematic illustration of the lead slug pickup station, forming station, through punch station, tower punch station, drop station and transfer mechanisms of the preferred embodiment.

Referring to FIG. 1, a battery terminal forming apparatus 10 includes four stations: a lead slug station 12; a forming station 14; a through punch station 16; and a tower punch station 160. Additionally, apparatus 10 includes a drop station 18, a first pick and place transfer mechanism 20, a vibratory transfer mechanism 22, a second pick and place transfer mechanism 24, an index assembly 26, and a third pick and place transfer mechanism 28.

Apparatus 10 creates a finished rolled L-shaped battery terminal 30d from a lead slug 30a. Lead slug 30a including a proximal end 32 and a distal end 34 is first transferred from lead slug station 12 to forming station 14 with first pick and place transfer mechanism 20. In forming station 14 lead slug 30a is formed into a semi-finished L-shaped battery terminal 30b including a tower 36, a flange 38, a base 40 having a frusto-conical beveled recess 42, a head 44 having an annular ring 46, and a recess 48 having a blank wall 50.

Semi-finished L-shaped battery terminal 30b is removed from forming station 14 and positioned by vibratory transfer mechanism 22 for subsequent transfer by second pick and place transfer mechanism 24 to index assembly 26 for presentation to through punch station 16.

Figure 8A:
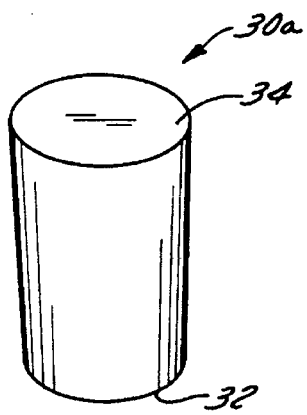
FIG. 8A is an isometric view of the lead slug.
Figure 8B:
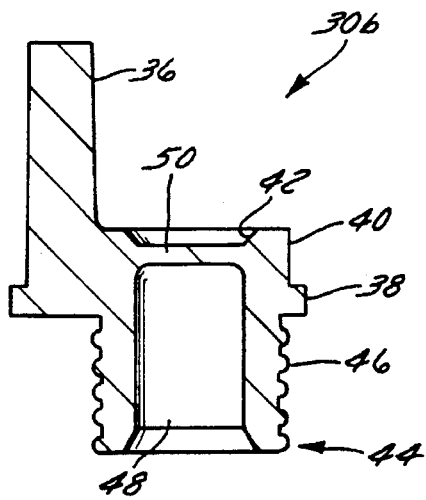
FIG. 8B is a cross-sectional view of the semi-finished L-shaped battery terminal.
Figure 8C:
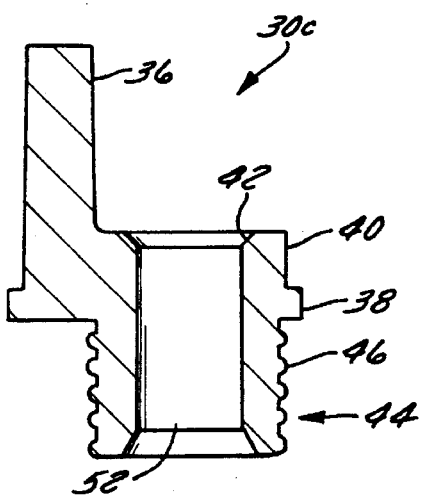
FIG. 8C is a cross-sectional view of the finished L-shaped battery terminal.
Figure 8D:
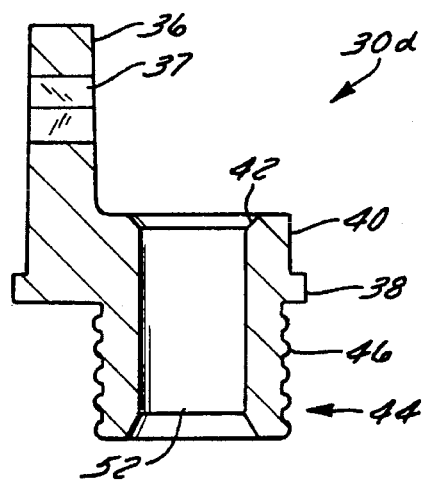
FIG. 8D is a cross-sectional view of the finished L-shaped battery terminal with a recess in the tower.
Figure 8E:
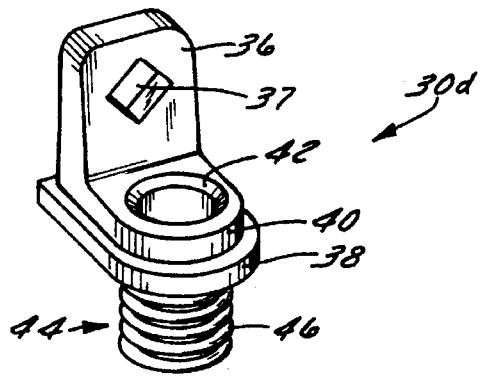
FIG. 8E is an isometric view of the finished L-shaped battery terminal with a recess in the tower.

In through punch station 16 semi-finished L-shaped battery terminal 30b is formed into finished L-shaped battery terminal 30c having a continuous recess 52. Index assembly 26 is rotatably indexed to tower punch station 160 where a recess 37 is formed in tower 36 (FIGS. 8D and 8E).

Referring to FIG. 1, the battery terminal forming apparatus 10 will now be described in greater detail. Lead slug 30a is formed and presented in lead slug station 12. Lead slug station 12 includes a transfer mechanism (e.g. guide tube) to transfer lead slug 30a to an indexing turntable 56. Indexing turntable 56 includes a circular index plate 58 having a plurality of truncated openings 60. Openings 60 are truncated by a base 62.

First pick and place transfer mechanism 20 includes an arm 20a and a gripper 20b. Lead slug 30a is transferred from lead slug station 12 to forming station 14 by activation of arm 20a and gripper 20b.

Figure 2:
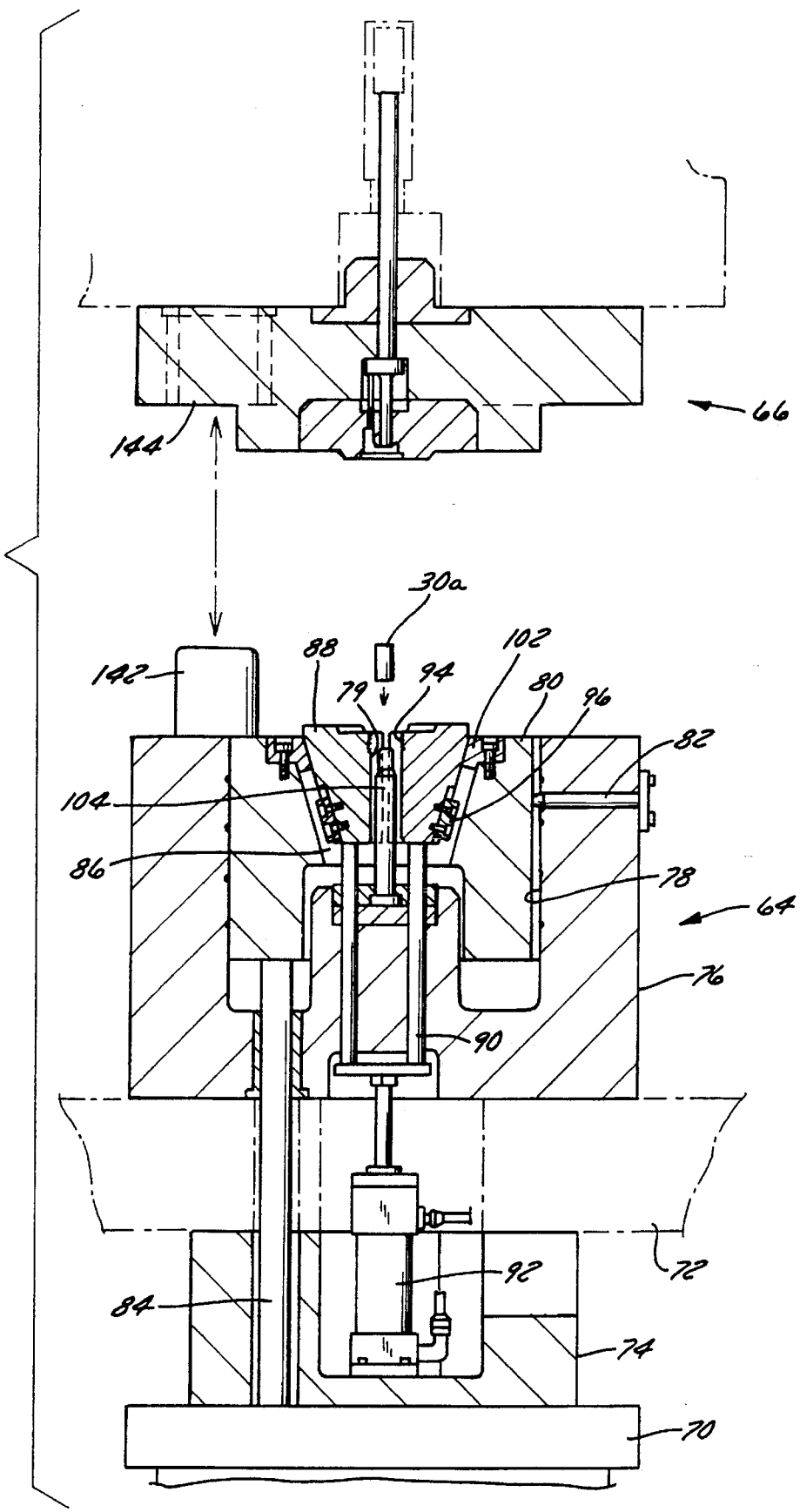
FIG. 2 is a schematic view of the die assembly in the open position.

As shown in FIG. 2, forming station 14 includes a lower die assembly 64 and an upper die assembly 66. Lower die assembly 64 generally includes a base for supporting a cushion assembly 70. A bolster 72 is supported on cushion assembly 70 by a block 74 to support a housing 76 having a cylindrical opening 78. A cushion ring 80 is aligned in cylindrical opening 78 in housing 76 and retained therein by means of pins 82. A number of rods 84 are supported on cushion assembly 70 in a position to engage cushion ring 80. Cushion ring 80 includes a conical opening 86 for supporting a cone shaped split die 88 which is seated in the conical opening in cushion ring 80. Cylindrical opening 79 is formed by split die 88. A pair of rods 90 are positioned beneath split die 88 and are supported on an ejector assembly 92 in block 74.

Figure 2A:
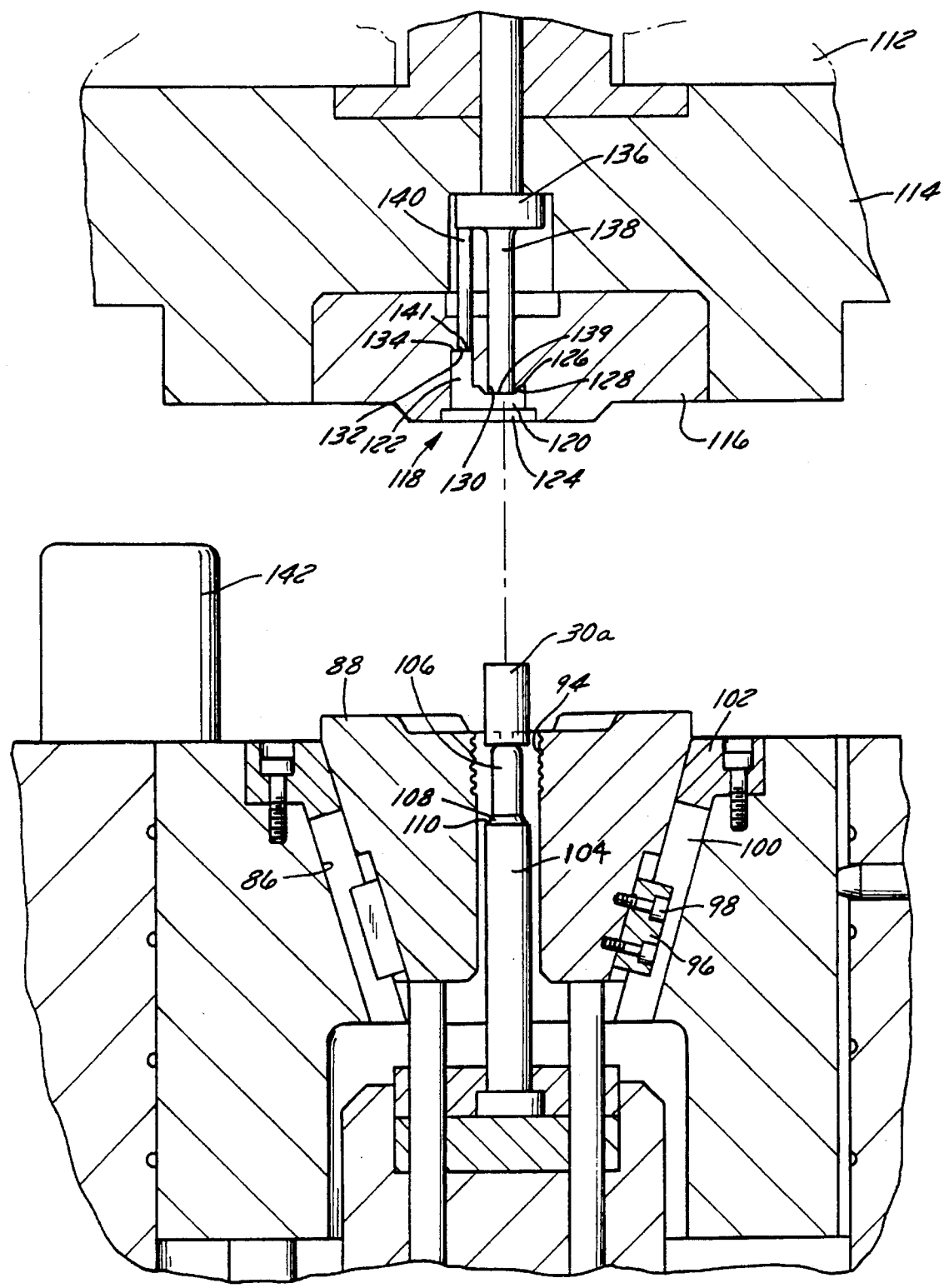
FIG. 2A is an enlarged view of the die assembly showing the lead slug positioned in the split die.

Each half of split die 88 includes a number of grooves 94 in an upper edge of each half of split die 88 as shown in FIG. 2A. Split die 88 includes a number of guide blocks 96 secured to split dies 88 by screws 98. Blocks 96 are aligned in dovetail grooves 100 provided in conical opening 86. Limit stop assemblies 102 are provided on the upper end of dovetail grooves 100 to limit the travel of split die 88.

Lower die assembly 64 further includes a forming punch 104 in alignment with cylindrical opening 79. Forming punch 104 includes a first region 106 having a uniform diameter, a second frusto conical region 108 of expanding diameter, and a stepped increase in diameter to a third region 110.

Upper die assembly 66 includes a press ram 112 having a die plate 114 mounted on the bottom of ram 112. A die 116 is mounted on die plate 114.

Die 116 includes a forming cavity 118 having a first cavity region 120 and a second cavity region 122. First cavity region 120 includes a forming cavity opening 124, and a top surface 126 including a frusto-conical beveled area 128 having an aperture 130. Second cavity region 122 extends normal to first cavity opening 124 and has a radial transition from top surface 126 of first cavity region 120 to allow proper flow of lead into second cavity region 122. Second cavity region 122 further includes an opening 132 on the top surface 134.

A knockout bar assembly 136 is supported by the press ram 112. Knockout bar assembly 136 includes a first rod 138 in alignment with cavity opening 124 and forming punch 104. Knockout bar assembly 136 further includes a second rod 140 having an end 141 in alignment with opening 132 in second cavity 122. First rod 138 has an end 139 positioned at the cavity opening 124 of the frusto-conical recess area 128 during the forming operation. Similarly, second rod end 141 is positioned in alignment with opening 132 in second cavity 122. A number of cylindrical guide blocks 142 are provided on the upper end of housing 76 which are aligned with openings 144 in the die plate 114 for aligning the upper and lower dies during operation.

Referring to FIG. 1 vibratory transfer mechanism 22 includes side walls 22a which are spaced apart a distance less than the width of flange 38. Side walls 22a are angled downward and are vibrated to translate semi-finished battery terminal 30b toward the end of side walls 22a.

Referring to FIG. 1 second transfer pick and place mechanism 24 includes an arm 24a and a gripper 24b for transferring a semi-finished L-shaped battery terminal 30b from vibratory transfer mechanism 22 to a fixture or an index assembly 26.

Figure 6A:
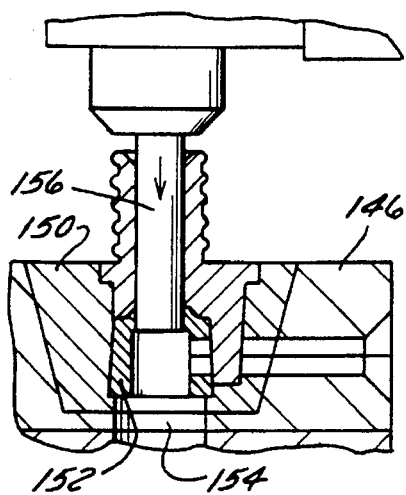
FIG. 6A is a partial cross-sectional view of the tower punch station.
Figure 6:
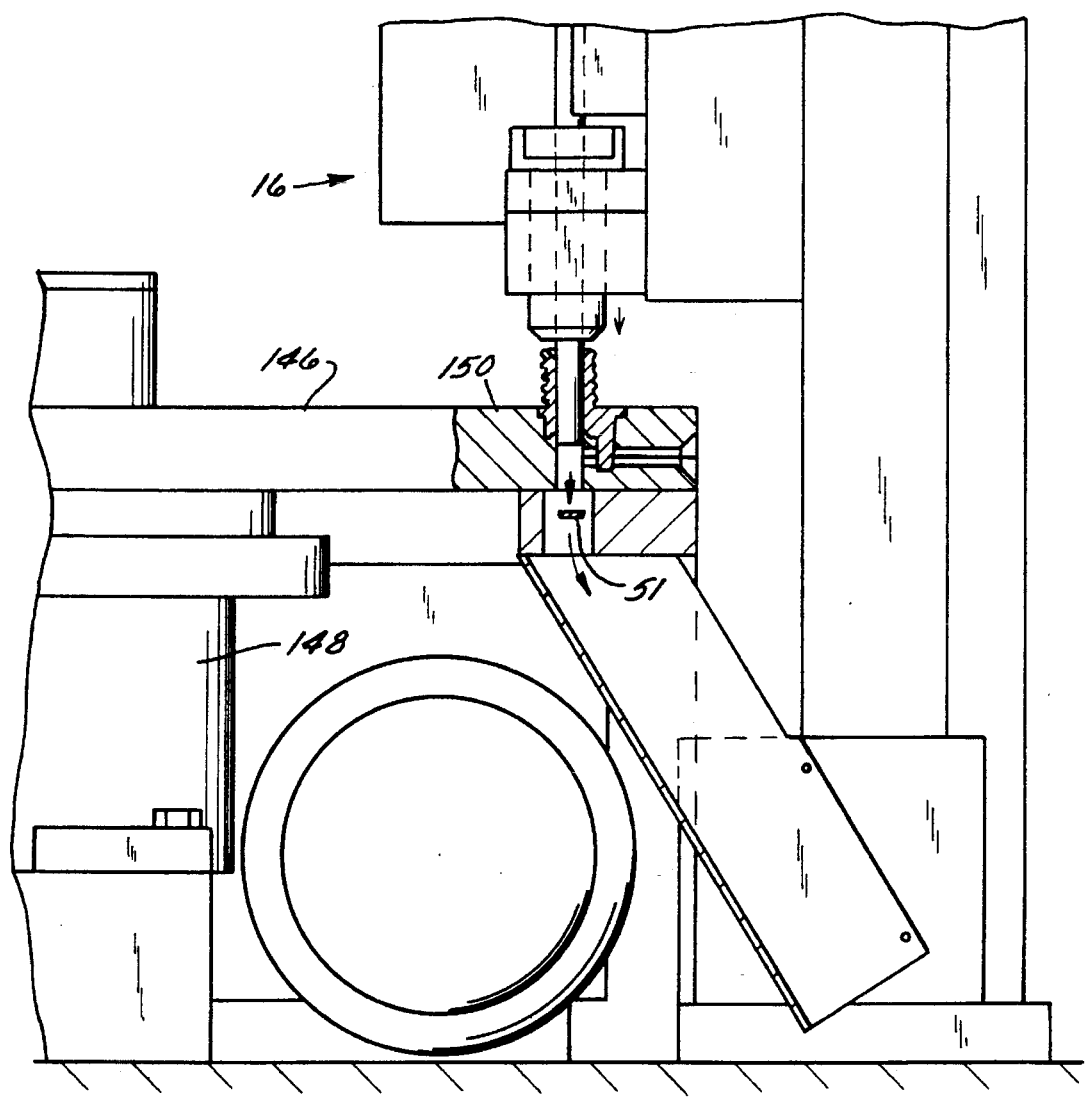
FIG. 6 is a schematic illustration of the through punch station.

As shown in FIGS. 6 and 6A index assembly 26 includes a circular index plate 146 mounted for rotary motion on a base 148. Circular index plate 146 includes a plurality of index dies 150, which are configured to support tower 36, base 40 and flange 38 of semi-finished L-shaped battery terminal 30b. As shown in FIG. 6A circular index plate 146 further includes an anvil 152 having an opening 154 located at the base of each index die 150. Anvil 152 is configured to support the top side of base 40 and frusto-conical recess 42 of semi-finished L-shaped battery terminal 30b.

Through punch station 16 is mounted in overhanging relationship to the edge of circular index plate 146. Through punch station 16 includes a through punch 156 aligned with the opening 154 of anvil 152.

Figure 7:
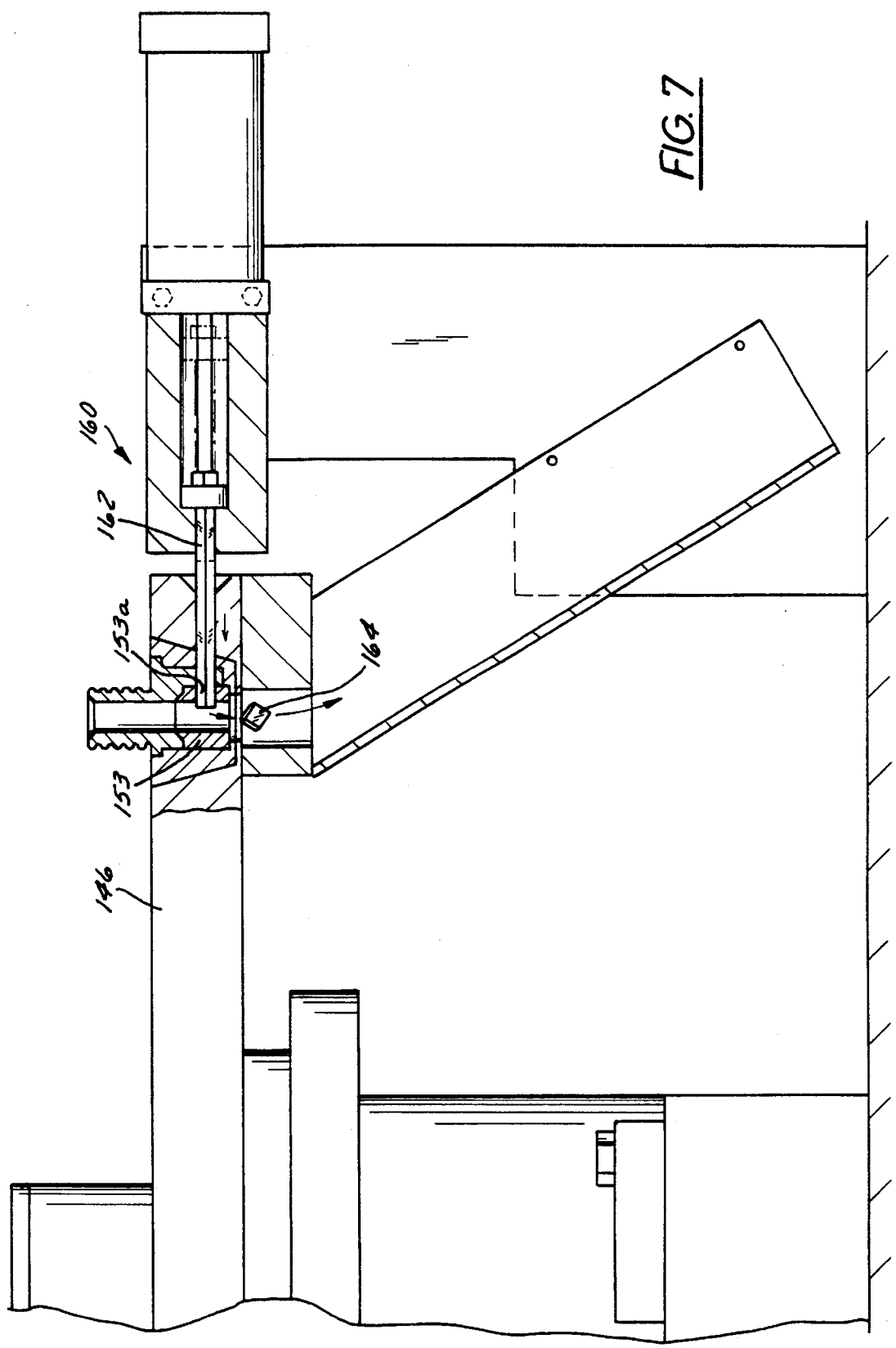
FIG. 7 is a schematic illustration of the tower punch station.

As shown in FIG. 7 circular index plate 146 further includes a tower anvil 153 having an opening 153a located within the base of each index die 150. Tower anvil 153 is configured to support a side of tower 36 of finished L-shaped battery terminal 30c.

Tower punch station 160 is located parallel to circular index plate 146 to permit tower punch 162 to extend through tower 36 when finished L-shaped battery terminal 30c is supported within index die 150.

The method of creating an L-shaped finished battery terminal utilizing apparatus 10 as described in above will now be described in greater detail. Referring to FIG. 1, an elongated cylindrical lead slug 30a is first formed (e.g. cut or sheared) from an extruded lead wire in lead slug station 12. Lead slug 30a includes proximal end 32, and distal end 34 (FIG. 8A). Lead slug 30a is transferred from lead slug station 12 by means of a transfer mechanism (e.g. guide tube) to indexing turntable 56. Lead slug 30a is received in opening 60 where proximal end 32 is supported by base 62. Indexing turntable 56 is rotatably indexed to permit lead slugs 30a to be removed by first pick and place transfer station 20.

Arm 20a and gripper 20b of first pick and place transfer station 20 transfers lead slug 30a from indexing turntable 56 to forming station 14.

Figure 3:
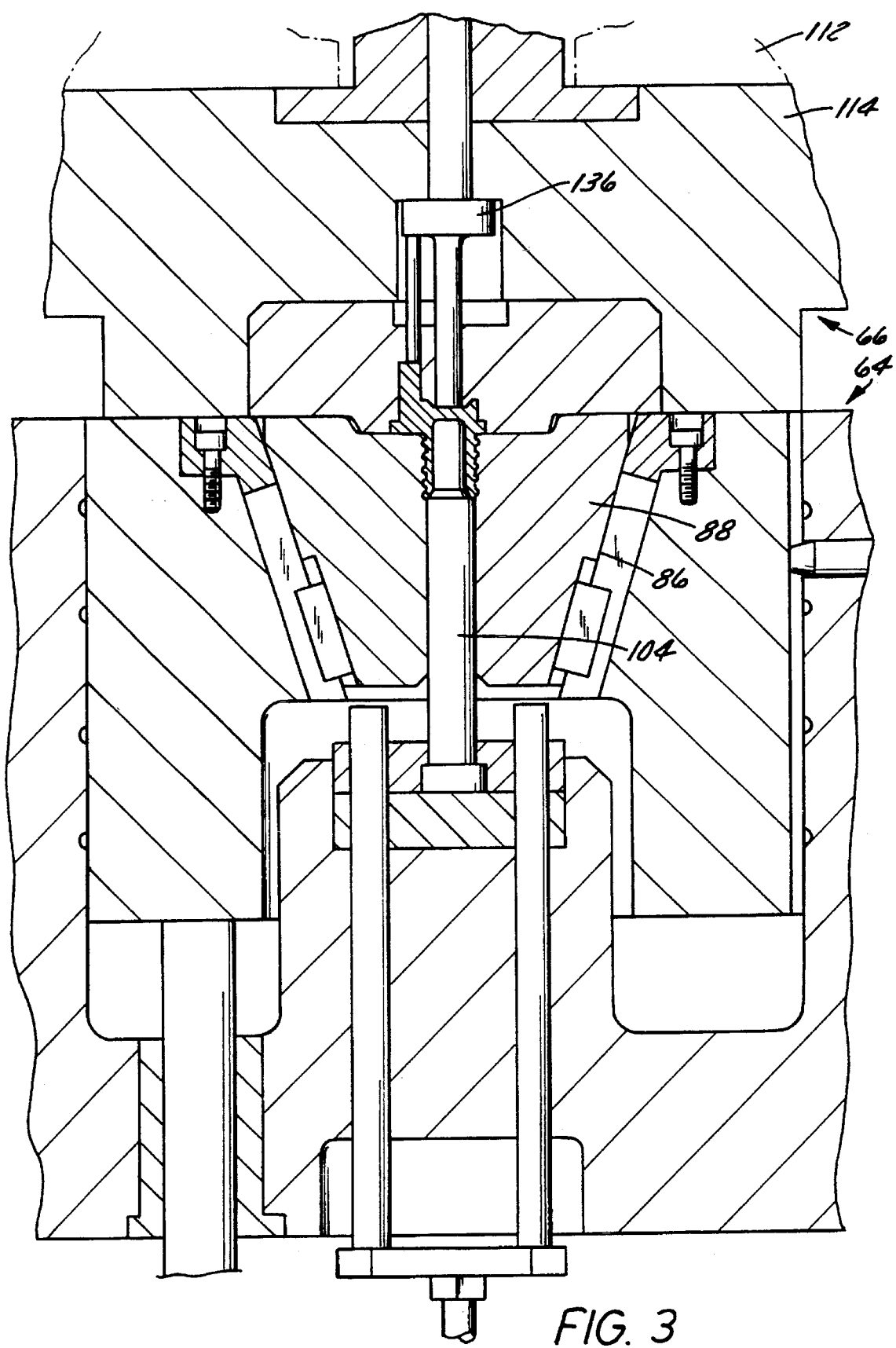
FIG. 3 is a cross-sectional view of the die assembly showing the press ram in the closed position.

Referring to FIGS. 2 and 2a lead slug 30a is placed within cylindrical opening 79 formed by split die 88. Referring to FIG. 3 press ram 112 forces split die assembly 88 down, such that split die assembly 88 is wedged into conical opening 86 in cushing ring 80. Once die assembly 88 is seated in cushion ring 80, the face of die plate 114 bears against the surface of split die assembly 88. The cushion 70 resists the downward motion of split die 88 with sufficient force to maintain a seal between die plate 114 and split die 88 while plate 114 and split die 88 are extended down onto stationary forming punch 104. Die plate 114 and split die 88 are lowered such that stationary forming punch 104 extends upward into forming cavity 118 toward the end 139 of first rod 138 of knock out bar assembly 136.

As a result lead slug 30a flows between split die 88, forming punch 104, forming cavity 118 and first and second rods ends 139, 141. The radial transition between first region 120 and second region 122 of forming cavity 118 facilitates the flow of lead to second region 122.

In this manner lead slug 30a is formed into a semi-finished L-shaped battery terminal 30b including a head 44 with a plurality of annular rings 46 formed in the grooves 94 of split die 88, a flange 38, a base 40, and a tower 36. Additionally, a recess 48 extending from proximal end 32 at head 44 and terminating at a blank wall 50 near frusto-conical recess 42 is formed by the profile of forming punch 104 (see FIG. 8B).

Figures 4, 5:
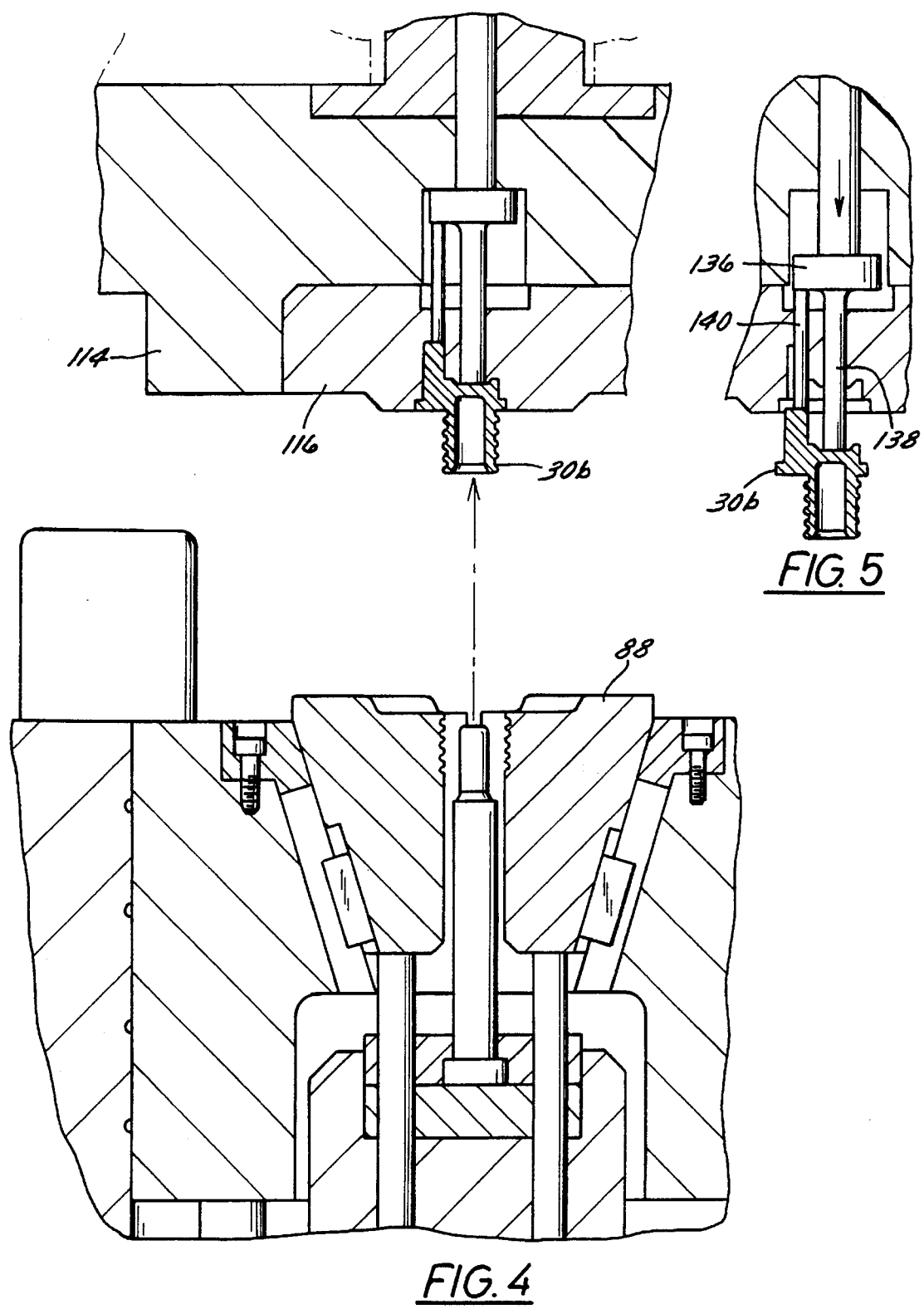
FIG. 4 is a cross-sectional view of the die showing the split die in the open position to release the terminal.
FIG. 5 is a partial view of the upper die showing the knock out bar in the down position to release the terminal from the upper die.

Referring to FIG. 4, as upper die assembly and lower die assembly 64, 66 are separated split die 88 is moved upward by pins 82 simultaneously with the upward movement of press ram 112 allowing split die 88 to open outwardly from semi-finished L-shaped terminal 30b. Guide blocks 96 follow the path of dovetail grooves 100 to move split die assembly 88 away from semi-finished L-shaped battery terminal 30b. The semi-finished L-shaped battery terminal 30b remains seated in forming cavity 118 of die 116.

Referring to FIG. 5 upper die assembly 66 is shown raised to the upper position. Semi-finished L-shaped battery terminal 30b is released from die 116 by actuating knockout bar assembly 136, such that first rod 138 and second rod 140 extend downward to knock semi-finished L-shaped battery terminal 30b out of forming cavity 118.

As semi-finished L-shaped battery terminal 30b is released from upper die assembly 66, it is expelled out of the forming station 14 by means of a timed blast of compressed air.

Semi-finished L-shaped battery terminal 30b is deposited in vibratory transfer mechanism 22 where the partial-finished battery terminal 30b is orientated between side walls 22a such that head 44 is facing up and presented for transfer by second transfer mechanism 24.

Arm 24a and gripper 24b of second transfer station transfers semi-finished L-shaped battery terminal 30b from vibratory transfer mechanism 22 to index die 150 such that head 44 is face up and tower 36 and base 40 are supported by index die 150 and anvil 152 (See FIG. 6).

Circular index plate 146 is indexed such that semi-finished L-shaped battery terminal 30b is aligned with through punch station 16. When through punch station 16 is activated through punch 156 cold extrudes a disc 51 from blank wall 50 forming a continuous recess 52 extending from proximal end 32 to frusto-conical recess 42. In this manner a finished L-shaped battery terminal 30c is formed. (FIG. 8C).

Circular index plate 146 is indexed such that finished L-shaped battery terminal 30c is aligned with tower punch station 160 (FIG. 7). When tower punch station 160 is activated tower punch 162 cold extrudes a segment 164 from tower 36 forming a recess 37 in tower 36. In this manner a finished L-shaped battery terminal 30d having a recess 37 in tower 36 is formed (See FIG. 8D).

Transfer mechanism 28 subsequently transfers finished rolled battery terminal 30d to drop station 18.

Figure 9:
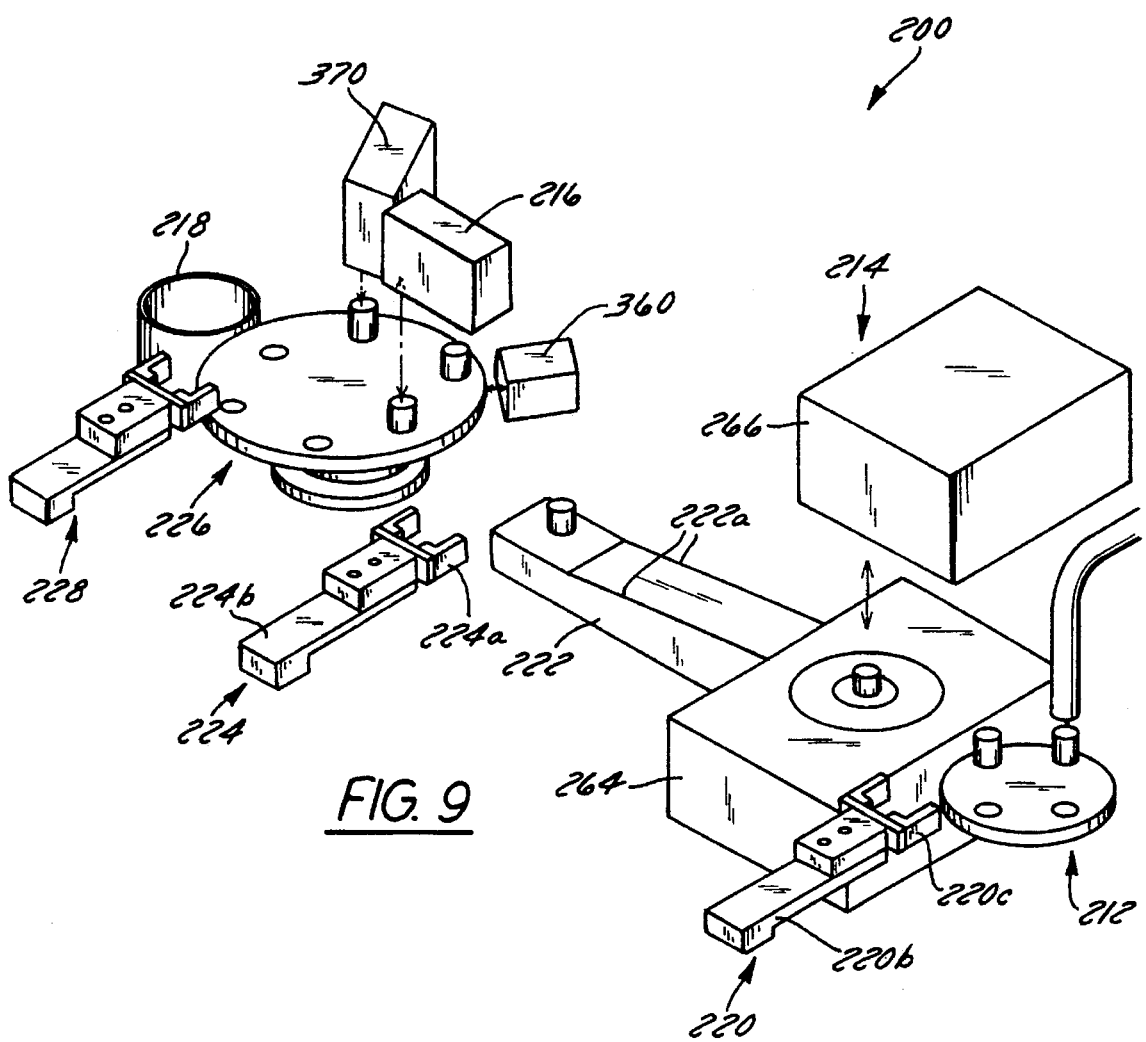
FIG. 9 is a schematic illustration of the lead slug pickup station, forming station, through punch station, radial rolling station, drop station and transfer mechanisms of the alternative embodiment.

Referring to FIG. 9, an alternative embodiment of a battery terminal forming apparatus 200 includes five stations: a lead slug station 212; a forming station 214; a through punch station 216; a tower punch station 360; and a radial rolling station 370. Additionally, apparatus 200 includes a drop station 218, a first pick and place transfer mechanism 220, a vibratory transfer mechanism 222, a second pick and place transfer mechanism 224, an index assembly 226, and a third pick and place transfer mechanism 228.

Figure 13A:
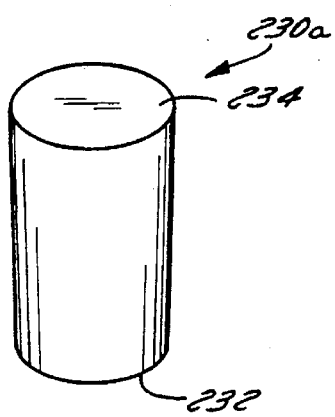
FIG. 13A is an isometric illustration of the lead slug.
Figure 13B:
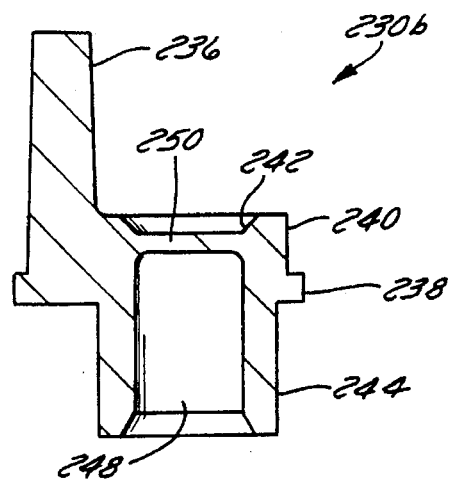
FIG. 13B is a cross-sectional view of the partial-finished L-shaped battery terminal.

Apparatus 200 creates a finished rolled L-shaped battery terminal 230e (FIG. 13F) from a lead slug 230a (FIG. 13A). Lead slug 230a including a proximal end 232 and a distal end 234 is first transferred from lead slug station 212 to forming station 214 with first pick and place transfer mechanism 220. In forming station 214 lead slug 230a is formed into a partial-finished L-shaped battery terminal 230b including a tower 236, a flange 238, a base 240 having a frusto-conical beveled recess 242, a head 244 having a uniform diameter, and a recess 248 having a blank wall 250 (FIG. 13B).

Partial-finished L-shaped battery terminal 230b is removed from forming station 214 and positioned by vibratory transfer mechanism 222 for subsequent transfer by second pick and place transfer mechanism 224 to index assembly 226 for presentation to through punch station 216.

Figure 13C:
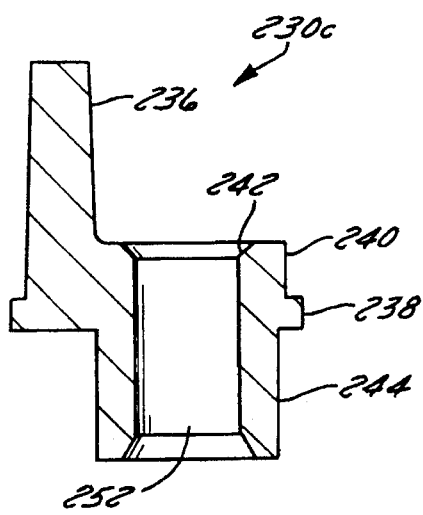
FIG. 13C is a cross-sectional view of the near-finished battery L-shaped battery terminal.
Figure 13D:
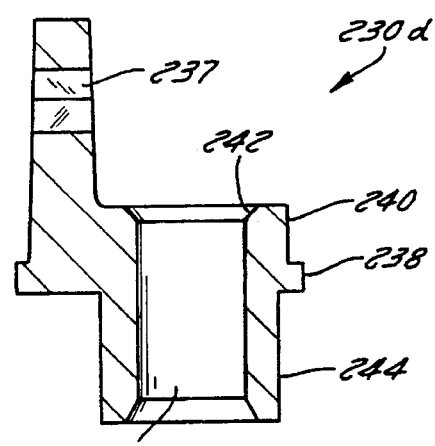
FIG. 13D is a cross-sectional view of the near-finished battery L-shaped battery terminal with a recess in the tower.

In through punch station 216 partial-finished L-shaped battery terminal 30b is formed into near-finished L-shaped battery terminal 230c having a continuous recess 252 (FIG. 13C). Index assembly 226 is rotatably indexed to tower punch station 360 where a recess 237 is formed in tower 236. In this manner a near-finished L-shaped battery terminal 230d having a recess 237 in tower 236 is formed (FIG. 13D).

Index assembly 226 is rotatably indexed by an index drive assembly such that near-finished battery terminal 230d is positioned in radial rolling station 370. Finally, a finished rolled L-shaped battery terminal 230e having annular rings 246 (FIGS. 13E, 13F) is formed in radial rolling station 370.

Referring to FIG. 9, battery terminal forming apparatus 200 will now be described in greater detail. Lead slug 230a is formed and presented in lead slug station 212. Lead slug station 212 includes a transfer mechanism (e.g. guide tube) to transfer lead slug 230a to an indexing turntable 256. Indexing turntable 256 includes a circular index plate 258 having a plurality of truncated openings 260. Openings 260 are truncated by a base 262. Lead slug 230a is formed and presented in lead slug station 212.

First pick and place transfer mechanism 220 includes an arm 220a and a gripper 220b. Lead slug 230a is transferred from lead slug station 212 to forming station 214 by activation of arm 220a and gripper 220b.

Figure 10:
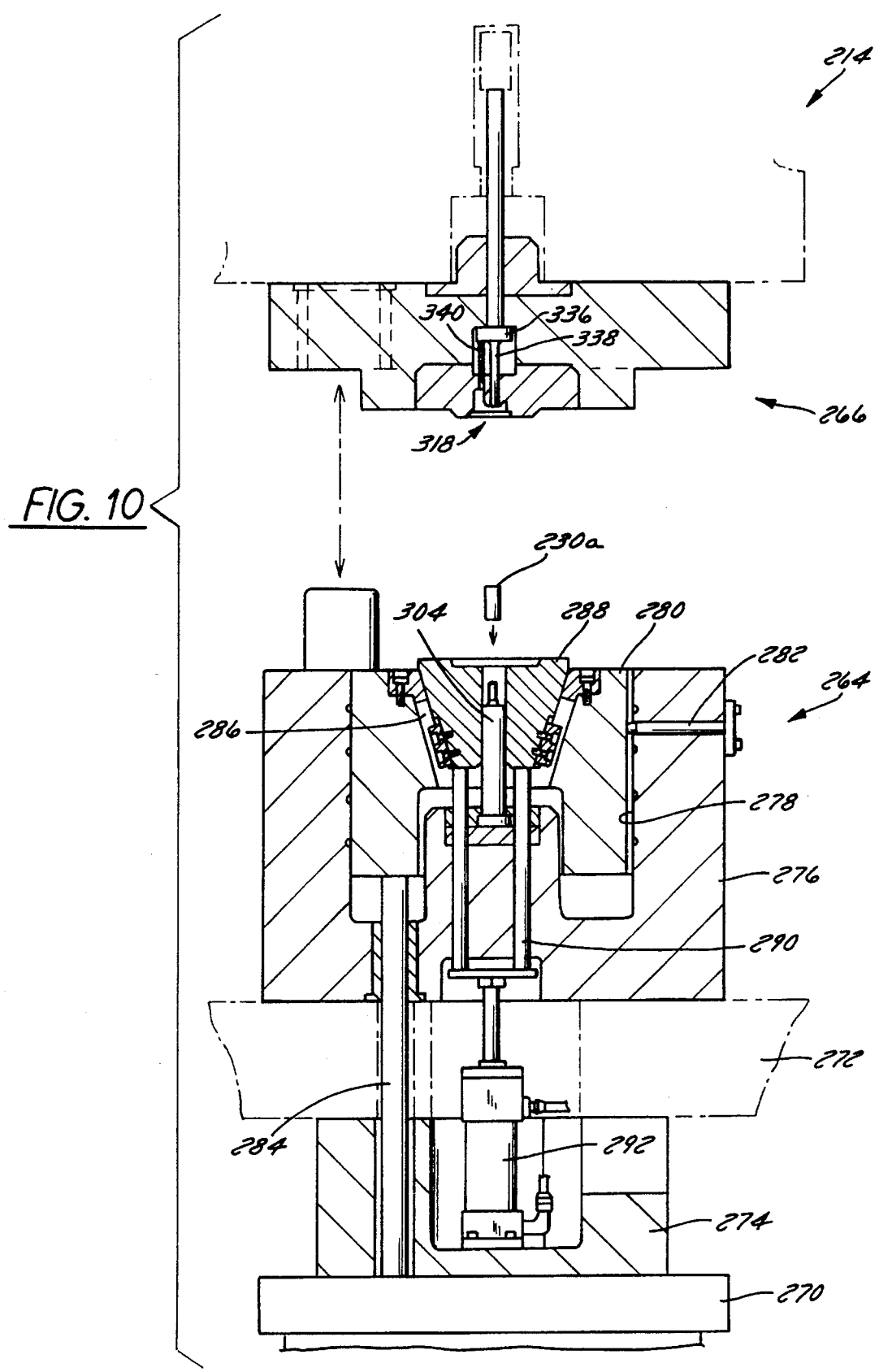
FIG. 10 is a cross-sectional view of the forming station of the alternative embodiment.
Figure 10A:
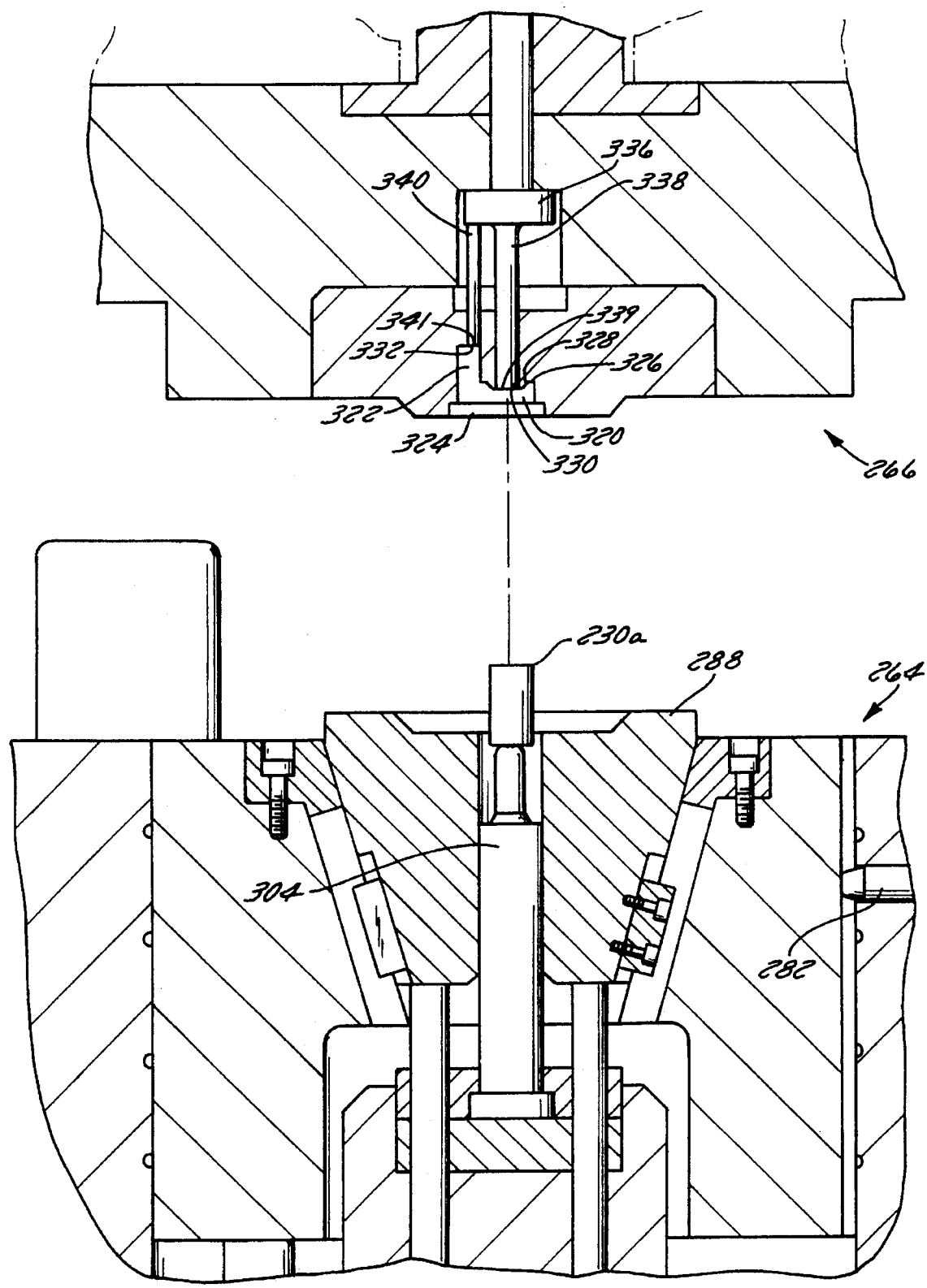
FIG. 10A is an enlarged view of the die assembly showing the lead slug positioned in the unitary die of the alternative embodiment.

As shown schematically in FIGS. 10 and 10A, forming station 214 is a stand alone press including a lower die assembly 264 and an upper die assembly 266. Lower die assembly 264 generally includes a base for supporting a cushion assembly 270. A bolster 272 is supported on cushion assembly 270 by a block 274 to support a housing 276 having a cylindrical opening 278. A cushion ring 280 is aligned in cylindrical opening 278 in housing 276 and retained therein by means of pins 282. A number of rods 284 are supported on cushion assembly 270 in a position to engage cushion ring 280. Cushion ring 280 includes a conical opening 286 for supporting a cone shaped split die 288 which is seated in the conical opening in cushion ring 280. Lower die assembly 264 includes a unitary die 288 and stationary forming punch 304. Unitary die 288 includes an inner profile configured to form head 244 having a substantially uniform diameter.

Upper die assembly 266 includes a forming cavity 318 having a first cavity region 320 and a second cavity region 322. First cavity region 320 includes a forming cavity opening 324, and a top surface 326 including a frusto-conical beveled area 328 having an aperture 330. Second cavity 322 extends normal to first cavity opening 324 and has radial transition from top surface 326 of first cavity region 320 to allow proper flow of lead into second cavity region 322. Second cavity 322 further includes an opening 332 at the top surface of second cavity 322.

Upper die assembly 266 further includes a knockout bar assembly 336 having a first rod 338 in alignment with aperture 330 and forming punch 304. Knockout bar assembly 336 further includes a second rod 340 having an end 341 in alignment with opening 332 in second cavity 322. First rod 338 has an end 339 which is positioned in alignment with aperture 330 of frusto-conical recess area 328 during the forming operation. Similarly, second rod end 341 is positioned in alignment with opening 332 in the second cavity 322.

Referring to FIG. 9 vibratory transfer mechanism 222 includes side walls 222a which are spaced apart a distance less than the width of flange 238. Side walls 222a are angled downward and are vibrated to translate partial-finished L-shaped battery terminal 230b toward the end of side walls 222a.

Referring to FIG. 9 second transfer pick and place mechanism 224 includes an arm 224a and a gripper 224b for transferring a partial-finished L-shaped battery terminal 230b from vibratory transfer mechanism 222 to a fixture or an index assembly 226.

Figure 11:
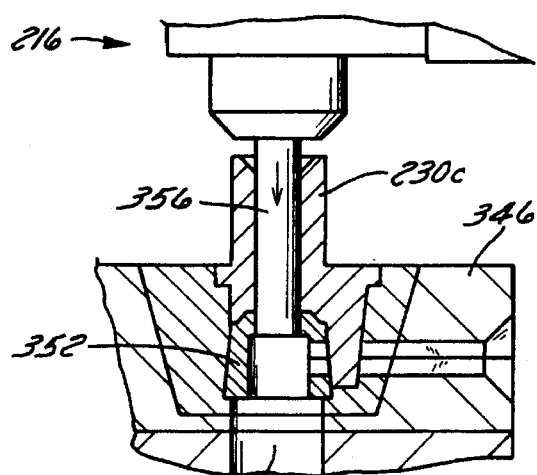
FIG. 11 is a partial cross-sectional view of the through punch station.
Figures 12, 12A, 12B:
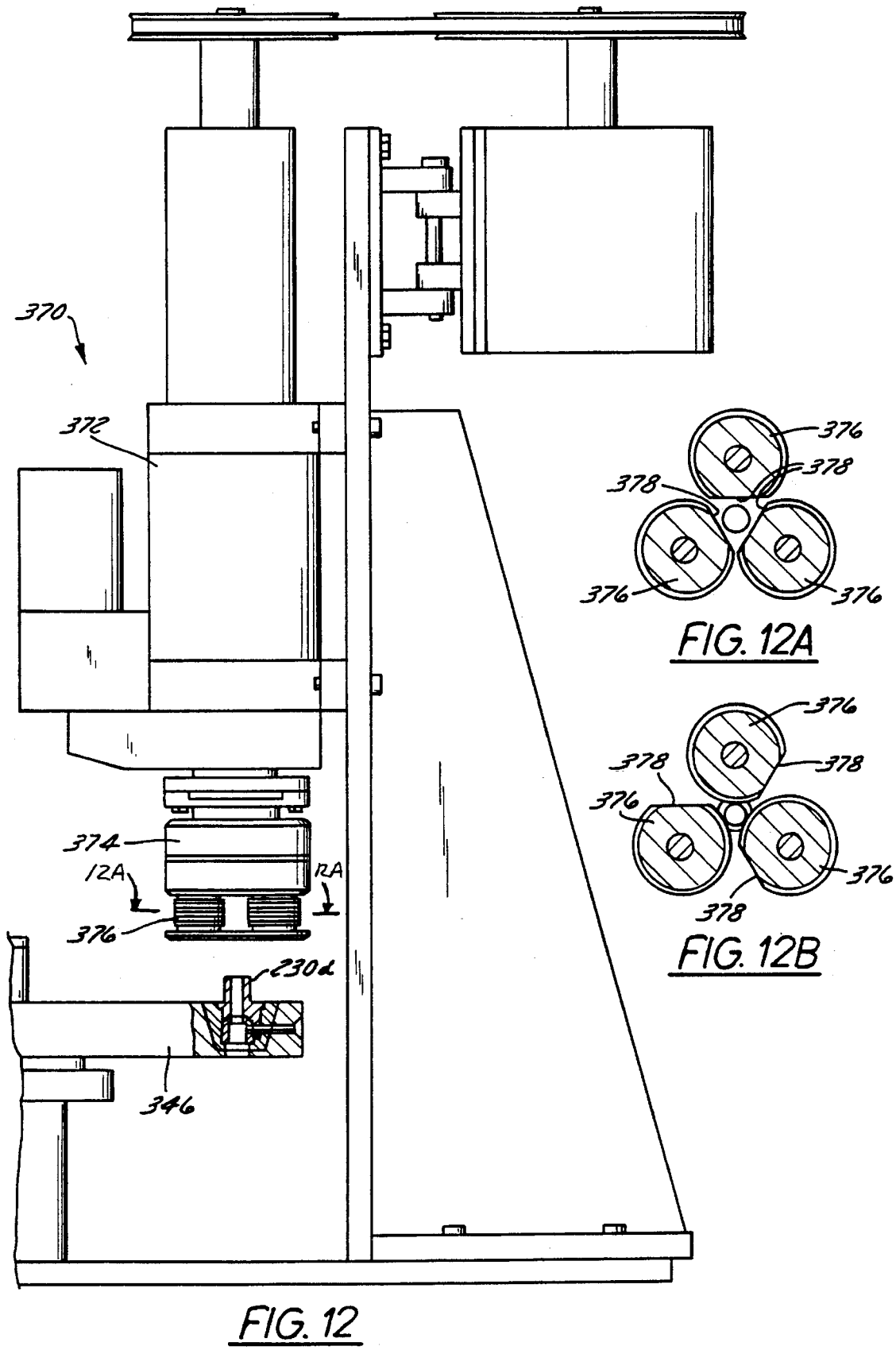
FIG. 12 is a cross-sectional view of the radial rolling head station.
FIG. 12A is a cross-sectional view of the rollers of the radial rolling head station.
FIG. 12B is a cross-sectional view of the rollers of the radial rolling head station in the engaged position.

As shown in FIGS. 9 and 11–12 index assembly 226 includes a circular index plate 346 mounted for rotary motion on a base 348. Circular index plate 346 includes a plurality of index dies 350, which are configured to support tower 236 and base 240 of partial-finished L-shaped battery terminal 230b. As shown in FIG. 11 circular index plate 346 further includes an anvil 352 having an opening 354 located at the base of each index die 350. Anvil 352 is configured to support the top side of base 240 and frusto-conical recess 242 of partial-finished L-shaped battery terminal 230b.

Through punch station 216 is mounted in overhanging relationship to the edge of circular index plate 346. Through punch station 216 includes a through punch 356 aligned with the opening 354 of anvil 352.

As shown in FIG. 11 circular index plate 346 further includes an opening 353a located within the base of each index die 350.

Tower punch station 360 is located parallel to circular index plate 346 to permit a tower punch to extend through tower 236 when near-finished L-shaped battery terminal 230c is supported within index die 350.

As shown in FIG. 12 radial rolling station 370 includes a drive assembly 372, a ring forming head 374 having three rollers 376 configured to form annular rings 246 on near-finished battery terminal 230c. Each roller 376 includes a flat portion 378 (FIG. 12A). Ring forming head 374 is mounted in overhanging relationship to the edge of circular index plate 346 located in a region other than through punch station 216. Ring forming head 374 is further situated in alignment with index die 350 permitting engagement of ring forming head 374 with head 244 of near-finished L-shaped battery terminal 230c. In this embodiment ring forming head 374 is of the type manufactured by Fette type Radial Rolling Head E 16 A 00 having three rollers 366 configured to create annular rings 246.

The method of creating an L-shaped finished battery terminal utilizing apparatus 200 as described in above will now be described in greater detail. Referring to FIG. 9, an elongated cylindrical lead slug 230a is first formed (e.g. cut or sheared) from an extruded lead wire in lead slug station 212. Lead slug 230a includes proximal end 232, and distal end 234 (FIG. 13A). Lead slug 230a is transferred from lead slug station 212 by means of a transfer mechanism (e.g. guide tube) to indexing turntable 256. Lead slug 230a is received in opening 260 where proximal end 232 is supported by base 262. Indexing turntable 256 is rotatably indexed to permit lead slugs 230a to be removed by first pick and place transfer station 220.

Arm 220a and gripper 220b of first pick and place transfer station 220 transfers lead slug 230a from indexing turntable 258 to forming station 220 and places lead slug proximal end 232 in contact with lower die assembly 264 directly below forming cavity 318. When forming station 220 is cycled, upper die assembly 266 and lower die assembly 264 come together and are lowered onto forming punch 304 such that forming punch 304 extends into forming cavity 318. Alternatively, forming punch 304 may be moveable and extended from lower die assembly 264 into upper die assembly 266 within forming cavity 318.

The lead in lead slug 230a flows between upper die 316, lower unitary die 288 and forming punch 304 to form partial-finished L-shaped battery terminal 230b. The radial transition between the first cavity region 320 and second cavity region 322 of the upper die 316 facilitates the flow of lead to second cavity region 322. In this manner partial-finished L-shaped battery terminal 230b is formed including tower 236, flange 238, base 240 having frusto-conical recess 242, head 244 having a substantially uniform diameter, and a recess 248 extending from head 244 toward the base of frusto-conical recess 242 concluding at a blank wall 250. Partial-finished battery terminal 30b is released from die 316 by actuating knock out bar assembly 336, such that first rod 338 and second rod 340 extend downward to knock semi-finished L-shaped battery terminal 230b out of forming cavity 318. As partial-finished L-shaped battery terminal 230b is released from upper die assembly 266, it is expelled out of forming station 214 by means of a timed blast of compressed air.

Partial-finished L-shaped battery terminal 230b is deposited in vibratory transfer mechanism 222 where it is orientated between side walls 222a such that head 244 is facing up and presented for transfer by second transfer mechanism 224.

Arm 224a and gripper 224b of second transfer station 224 transfers partial-finished L-shaped battery terminal 30b from vibratory transfer mechanism 222 to index die 350 such that head 244 is face up and tower 236 and base 240 are supported by index die 350 and anvil 352.

Circular index plate 346 is indexed such that partial-finished L-shaped battery terminal 230b is aligned with through punch station 216. When through punch station 216 is activated through punch 356 cold extrudes a disc 251 from blank wall 250 forming a continuous recess 252 extending from proximal end 32 to frusto-conical recess 242. In this manner a near-finished L-shaped battery terminal 230c is formed. (FIG. 13C).

Circular index plate 346 is indexed such that near-finished L-shaped battery terminal 230c is aligned with tower punch station 360. When tower punch station 360 is activated a tower through punch cold extrudes a segment from tower 236 forming a tower recess 237. In this manner a near-finished L-shaped battery terminal having a recess 237 in tower 236 is formed. (See FIG. 13D).

Figure 13E:
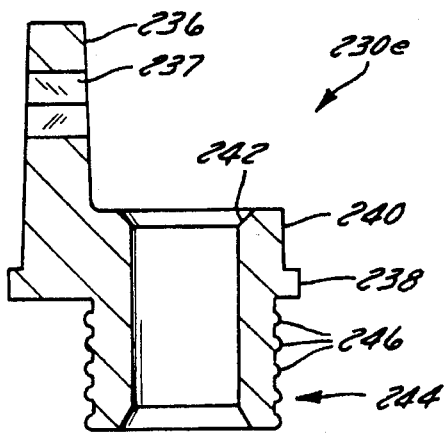
FIG. 13E is an cross-sectional view of the rolled L-shaped battery terminal.
Figure 13F:
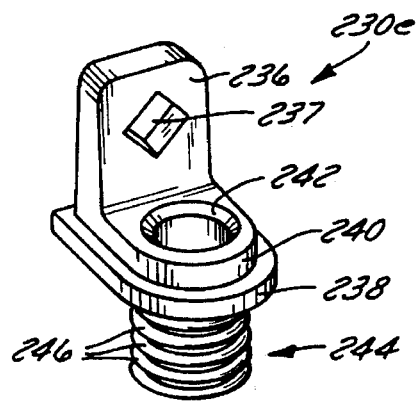
FIG. 13F is an isometric illustration of the rolled L-shaped battery terminal.

Circular index plate 346 is subsequently indexed such that near-finished L-shaped battery terminal 230d is aligned with radial rolling station 370 (FIG. 12). When radial rolling station 370 is activated ring forming head 374 engages head 244. Rollers 376 are initially positioned such that flat portion 378 of rollers 376 are facing head 244 (FIG. 12A). Ring forming head 374 is rotated by drive assembly 372 such that rollers 376 are rotated once thereby engaging head 244 and cold forming annular rings 246 (FIG. 12B). The diameter of head 244 of the near-finished battery terminal 230d is modified as a result of the engagement and rotation of the ring forming head 374. Annular rings 246 are formed not by removing material from head 244 but rather by the flowing of material. At the completion of the rotation the flat portions 378 of rollers 376 are facing head 244 permitting the disengagement of ring forming head 374 at the end of the cycle. In this manner a finished rolled L-shaped battery terminal 230e is formed having annular rings 246 (FIGS. 13E, 13F). Additionally, in contrast to a battery terminal formed with a split die, the finished rolled battery terminal 230d is formed without a flash line along the head in the direction of the longitudinal axis of the battery terminal. In the alternative embodiment, apparatus 200 includes two through punch stations 216, and two radial rolling stations 370 located about circular plate 346. Through punch stations 216 and radial rolling stations 370 are activated in such a manner as to increase the manufacturing rate of apparatus 200.

Transfer mechanism 228 subsequently transfers finished rolled battery terminal 230e to drop station 218.

Although the invention has been described in conjunction with specific embodiments thereof, it is evident that alternatives, modifications and variations will be apparent to those skilled in the art. For example ring forming head may create a single ring 246 or a plurality of rings 246 on the head 244. The ring forming head may also cold form other patterns on head 244 such as a knurled pattern. Additionally, head 244 may be rotated relative to the radial forming head. Additionally, lead slug station 12 may include an in line indexing device in place of a circular index plate 58. It is intended that the claims embrace these and other alternatives, modifications and variations which fall within the spirit and scope of the appended claims.

We claim:

1. An apparatus for cold forming an L-shaped lead battery terminal from a lead slug, the apparatus comprising:

a first die having a cylindrical inner profile to form a cylindrical head on the L-shaped lead battery terminal;

a second die including an L-shaped inner profile to form a base of the L-shaped lead battery terminal, the base including an L-shaped tower having a leg extending normal to the base and offset from a central longitudinal axis of the head;

a press attached to the dies to move the dies into a closed position to form a cavity therebetween; and a punch moveable relative to the first die to form a recess within the L-shaped lead battery terminal.

2. The apparatus of claim 1, wherein the L-shaped interior region includes a radial transition to allow proper flow of lead from the lead slug to form the tower.

3. The apparatus of claim 1, wherein the first die includes a split die mounted in the first die for movement into engagement with the second die, the split die including a radial recess for forming a radial ring on the head of the L-shaped lead battery terminal.

4. The apparatus of claim 1, wherein the first die includes a unitary die having an inner profile to form the head having a substantially uniform diameter.

5. The apparatus of claim 2, wherein L-shaped interior region includes a frusto-conical beveled area having an aperture to form a frusto-conical recess in the L-shaped lead battery terminal.

6. The apparatus of claim 5, wherein the punch is located in a cylindrical bore for extension through the first die and into the L-shaped interior region to form a recess terminating in a blank wall adjacent to the frusto-conical area.

7. The apparatus of claim 6, wherein the apparatus includes a punching station to remove the blank wall to form an L-shaped battery terminal having a continuous recess extending through the L-shaped battery terminal.

8. A method for manufacturing an L-shaped lead battery terminal in a cold forming process, the method comprising the steps of:

stamping a lead slug in a forming station having a split die to cold form a semi-finished L-shaped lead battery terminal including a head having a radial ring, a base, a tower extending from the base and offset from the head, and a recess extending from the head toward a top surface of the base terminating in a blank wall;

transferring the semi-finished L-shaped battery terminal to a through punch station; and punching the semi-finished L-shaped battery terminal in the through punch station forming an L-shaped battery terminal having a through hole.

9. The method according to claim 8, further including the step of:

punching the L-shaped battery terminal tower to form a recess in the tower.

10. A method for manufacturing L-shaped lead battery terminals in a cold forming process, the method comprising the steps of:

stamping a lead slug in a first cold forming station forming a partial-finished L-shaped lead battery terminal including a head having a substantially uniform outer diameter,
a flange,
a base,
a tower extending from the base and offset from the head, and
a recess extending from the head into the base and terminating in a blank wall;

transferring the partial-finished L-shaped battery terminal to a through punch station;

punching the partial-finished L-shaped battery terminal in the through punch station forming a near-finished L-shaped battery terminal having a through hole;

transferring the near-finished L-shaped battery terminal to a rolling station; and engaging a ring forming head on the head of the near-finished battery terminal in the third rolling station forming a rolled battery terminal having a head including an annular ring.

11. The method according to claim 10, further including the step of:

punching the L-shaped battery terminal tower to form a recess in the tower.

12. A press for cold forming a non-symmetric battery pole from a piece of lead, the battery pole including a cylindrical head having a central axis and a tower formed with the head and offset from the central axis, the press comprising:

a first die defining a tower-shaped cavity within which the tower is formed;

a second die defining a cylindrical cavity having a central axis within which the head is formed;

a press frame, the first and second dies being supported by the press frame to move into and out of engagement with the tower-shaped cavity being offset from the central axis, wherein the first and second dies form a closed cavity having a surface which generally defines the shape of the non-symmetric battery pole when the dies are substantially engaged; and a punch supported by the press frame to move within the closed cavity to force lead within the closed cavity into engagement with the surface.

13. The press of claim 12, wherein the second die is a split die, which defines circumferential rings which are formed about the axis of the head.

14. The press of claim 12 wherein the first and second dies are single-piece dies.

* * * * *